(12) United States Patent
Simkowski

(10) Patent No.: US 6,582,179 B1
(45) Date of Patent: Jun. 24, 2003

(54) CONTOURED PALLETIZER LAYER PAD

(75) Inventor: Donald J. Simkowski, Loveland, CO (US)

(73) Assignee: Goldco Industries, Inc., Loveland, CO (US)

( * ) Notice: Subject to any disclaimer, the term of this patent is extended or adjusted under 35 U.S.C. 154(b) by 0 days.

(21) Appl. No.: 09/809,840

(22) Filed: Mar. 19, 2001

(51) Int. Cl.$^7$ .............................................. B65H 29/00
(52) U.S. Cl. .................. 414/789.5; 108/53.1; 108/53.3; 108/57.29; 108/91
(58) Field of Search ....................... 414/789.5; 206/201, 206/203, 427; 108/53.1, 53.3, 57.29, 91; 211/55, 59.4, 49.1, 74

(56) References Cited

U.S. PATENT DOCUMENTS

| | | |
|---|---|---|
| 3,682,290 A | 8/1972 | Von Gall, Jr. et al. |
| 3,897,877 A | 8/1975 | Vandermeer et al. |
| 4,162,738 A * | 7/1979 | Wright .......................... 220/21 |
| 4,209,094 A * | 6/1980 | Bly ............................. 206/427 |
| 4,567,981 A * | 2/1986 | Headon .................... 206/45.14 |
| D283,676 S * | 5/1986 | Kochling ..................... D9/344 |
| 4,653,651 A * | 3/1987 | Flum .......................... 211/59.4 |
| 4,809,965 A | 3/1989 | Vander Meer et al. |
| 4,848,573 A * | 7/1989 | Salacuse ...................... 206/427 |
| 4,899,874 A * | 2/1990 | Apps et al. .................. 206/201 |
| 4,978,275 A | 12/1990 | Reid et al. |
| 5,016,761 A * | 5/1991 | Stoddard et al. ........... 211/59.4 |
| D329,932 S * | 9/1992 | Apps ........................... D34/40 |
| 5,651,461 A * | 7/1997 | Apps et al. .................. 206/503 |
| D390,458 S * | 2/1998 | Kristofferson ............... D9/341 |
| 5,876,180 A * | 3/1999 | Sims ........................ 414/795.6 |
| 6,047,844 A * | 4/2000 | McGrath .................... 220/516 |

* cited by examiner

Primary Examiner—Eileen D. Lillis
Assistant Examiner—Michael Lowe
(74) Attorney, Agent, or Firm—Robert E. Harris

(57) ABSTRACT

A contoured layer pad has first and second pockets with the pockets receiving different portions of unstable articles, such as the base and neck portions of containers. The pockets have end portions at opposite sides with side portions extending from the end portions, and the pockets at the opposite sides are associated and/or in substantial alignment. The contoured layer pad is positioned between first and second layers of the articles with opposite end portions of the articles received in the pockets so that the middle portions of the articles are maintained in close proximity to one another to improve the stability of the layers of articles. The contoured layer pad may be formed to have central and peripheral portions and/or to receive articles in nested relationship.

21 Claims, 4 Drawing Sheets

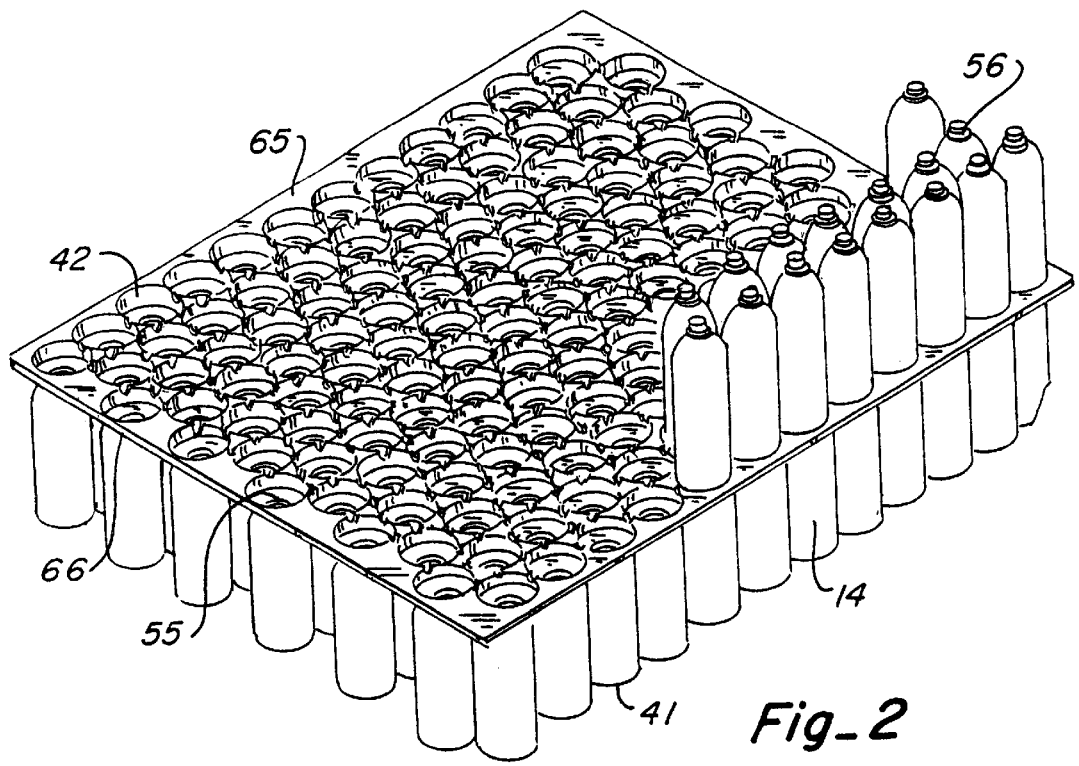
Fig_2
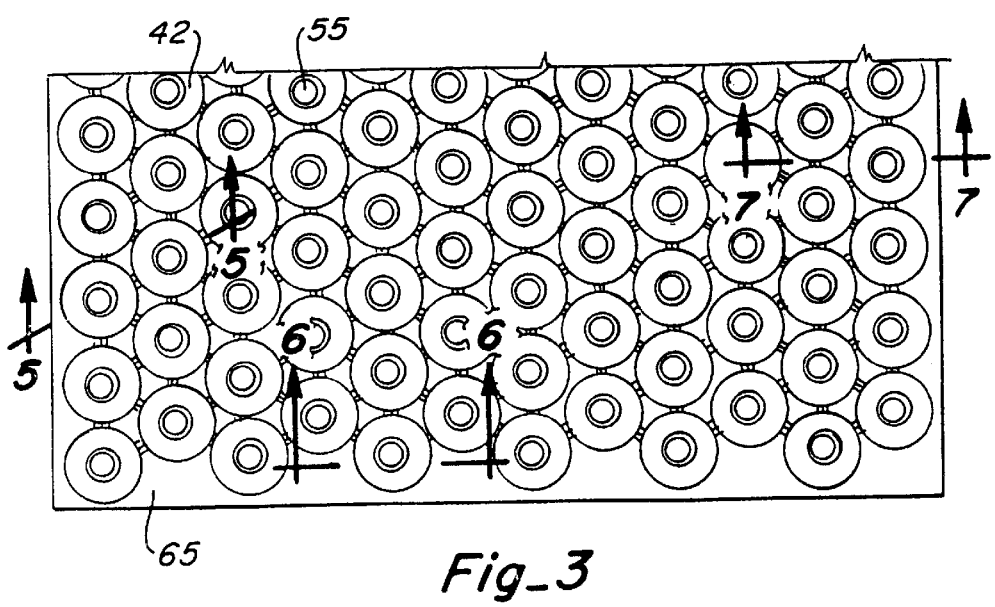
Fig_3

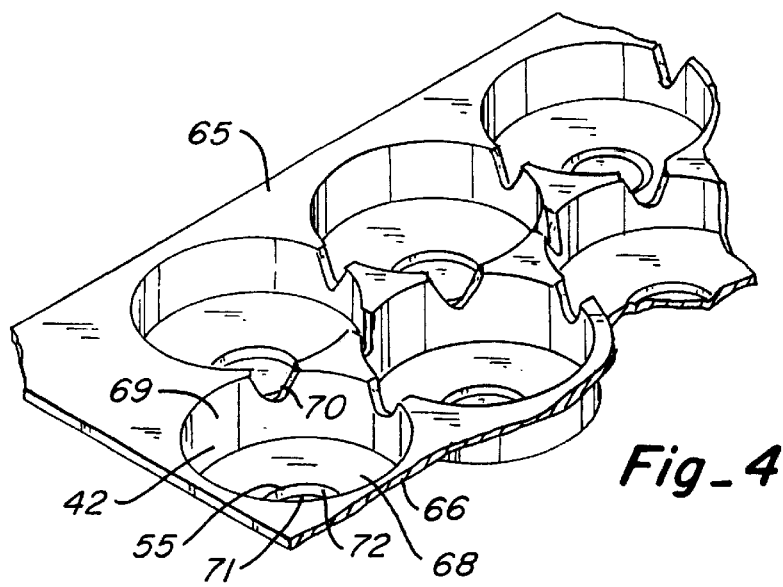
Fig_4
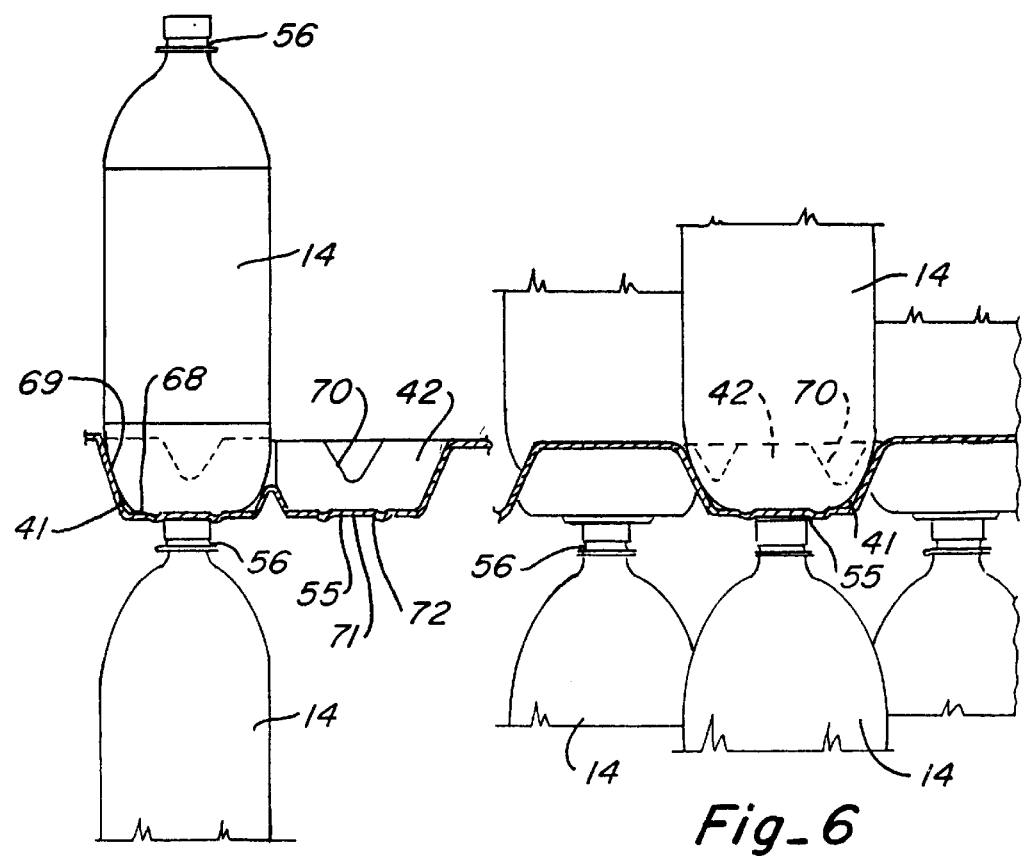
Fig_5
Fig_6

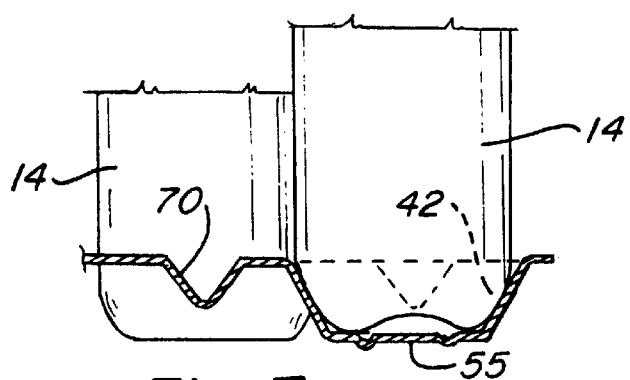
Fig_7
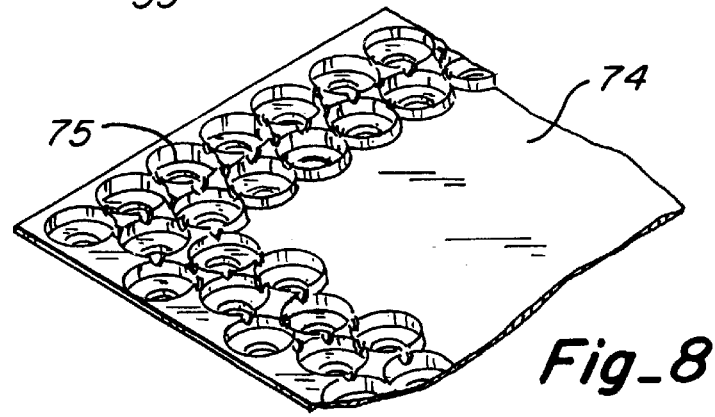
Fig_8
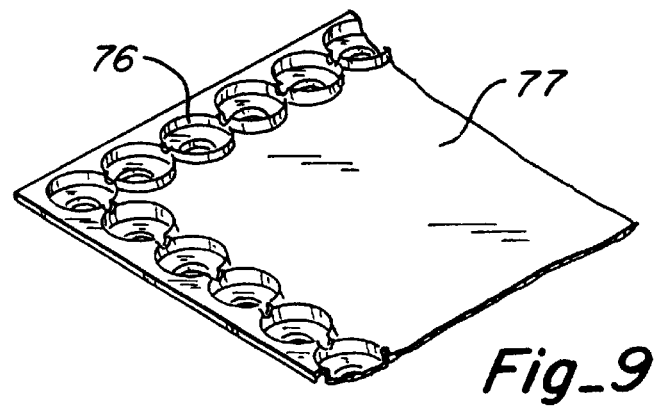
Fig_9

CONTOURED PALLETIZER LAYER PAD

FIELD OF THE INVENTION

This invention relates to a contoured layer pad, and, more particularly, to a contoured layer pad for use in connection with layers of unstable articles, such as palletized unstable articles, to stabilize the articles.

BACKGROUND OF THE INVENTION

It is oftentimes necessary to move and/or store articles, and it has been found that some articles, particularly unstable articles, such as, for example, plastic containers (or bottles), tend to become dislocated (normally to tip or fall) when moved between locations and/or when disturbed during movement or while stored, including while palletized in multiple layers.

Devices directed to moving articles, particularly unstable articles, such as containers, between locations, including movement of such articles to and/or from a palletizer, are now well known, and include, for example, devices for transporting and/or controlling articles using belts, movable arms and/or flow control (see, for example, U.S. Pat. No. 4,987,275 (Reid et al.), U.S. Pat. No. 5,271,709 (VanderMeer et al.), and U.S. Pat. No. 5,522,692 (Simkowski)), devices for supporting the articles at the neck portion of the articles for conveyance of the articles by movable grippers engaging the articles (see, for example, U.S. Pat. No. 4,802,571 (Born et al.) and U.S. Pat. No. 5,553,698 Patois et al.)), devices using vacuum pick up of the articles (see, for example, U.S. Pat. No. 2,858,009 (Bainbridge)) and/or devices for picking up articles and moving the articles between locations, including movement of such articles with at least partial straight line movement to and/or from a palletizer (see, for example, U.S. Pat. No. 2,858,009 (Bainbridge) and U.S. Pat. No. 3,517,831 Hahn)).

It is likewise known that devices capable of moving layers, or groups, of articles at a first area and depositing the articles at a second area to accomplish palletizing and/or depalletizing of articles, such as unstable articles, can also include pick up and insertion of flat layer pads during palletizing operations and pick up and removal of the flat laser pads during depalletizing operations using at least partial straight line movement (see, for example, U.S. Pat. No. 3,682,290 (Von Gal, Jr. et al.), U.S. Pat. No. 4,809,965 (VanderMeer et al.) and U.S. Pat. No. 4,978,275 (Reid et al.), with U.S. Pat. No. 3,682,290 also including at least partial straight line movement for pick up of both articles and layer pads).

Likewise, devices are also known for orienting articles and spacer sheets at a palletizer (see, for example, U.S. Pat. No. 3,897,877 (VanderMeer et al.)).

It has been found, however, that improvements in stabilization of at least some types of unstable articles, such as, for example, at least some plastic bottles, even when palletized on flat layer pads, are still needed, particularly with respect to preventing, or at least minimizing, dislocation when such unstable articles are disturbed, as, for example, by a side force exerted on the unstable articles when in layers on a pallet, which often results in dislocation of some, or even all, of the articles on the pallet.

SUMMARY OF THE INVENTION

This invention provides an improved layer pad that is particularly useful in improving stabilization of unstable articles, and particularly palletized unstable articles, such as containers, having a base portion and a neck portion.

The improved layer pad of this invention is contoured and is utilized in connection with layers of unstable articles to better stabilize the articles, and preferably includes groups of first and second pockets with the first pockets extending in a first direction from the first side of the contoured layer pad and the second pockets extending in a second direction from the second side of the contoured layer pad, and preferably with the first and second pockets receiving different ones of first and second portions of adjacent layers, or groups, of unstable articles.

The first pockets in the contoured layer pad are formed of a size and configuration to receive the first portions of the unstable articles (with the first pockets preferably having a size and configuration slightly larger than that of the first portions of the unstable articles to snugly receive the first portions of the unstable articles), and the second pockets are formed of a size and configuration to receive the second portions of the unstable articles (with the second pockets preferably having a size and configuration slightly larger than that of the second portions of the unstable articles to snugly receive the second portions of the unstable articles).

When utilized between adjacent layers of upright unstable articles, having a base portion and a neck portion, to be vertically stacked, the base portions of the unstable articles are received in the upward extending group of pockets in the contoured layer pad and the neck portions are received in the downward extending group of pockets in the contoured layer pad.

As is now preferred, the group of pockets at each side of the contoured layer pad include side portions that extend from end, or bottom, portions with the end portions of the second pockets being at end portions of the first pockets.

With the neck portions of the received unstable articles of reduced size relative to the base portions (as is now common for containers), the second pockets are also of reduced size to receive the neck portions of received articles, and each may be, for example, a ring, when the neck portion has a circular cross-section, extending, or projecting, in a direction away from the end portion of the second pocket a short distance relative to the distance that an associated first pocket extends in substantially the opposite direction for receiving the base portion of received articles.

As illustrated in the drawings, the base portions of the received articles may also have a circular cross-section and be received in first pockets in the contoured layer pad having a like size and configuration, but could have, for some applications, a different size and configuration with the formed pockets in the contoured layer pad having a like size and configuration (this could likewise be true for the neck portion when a circular cross-section is not required).

The pockets of each associated pair of pockets (one from each group of the first and second pockets forming each associated pair of pockets) are preferably formed such that substantial alignment of the unstable articles received in associated pockets is achieved.

The contoured layer pad may have the groups of pockets therein extending substantially throughout the entire layer pad, as is now preferred, but may, at least for some applications, have a flat portion (normally an inner, or central, portion) surrounded by one of more peripheral rows of pockets.

Each group of the first and second pockets formed in the layer pad preferably receive a different one of the articles of each layer, or group, of deposited articles, but the pockets of one, or both, of the groups of first and second pockets might, at least for some applications and normally with some resulting loss in stabilization of the articles, be configured to receive, at least in part, more than a single article of each layer in one, or both, of each group of pockets.

Unstable articles are preferably conveyed by layers, or groups, to the pallet during palletizing operations for deposit on a contoured layer pad thereat, and preferably are also removed from the pallet by layers, or groups, during depalletizing operations, and a contoured layer pad is deposited over each layer, or group, of unstable articles at the pallet during palletizing operations and removed from the pallet after each layer, or group, of articles is removed from the palletizer.

It is therefore an object of this invention to provide an improved layer pad.

It is another object of this invention to provide an improved layer pad for use with unstable articles.

It is another object of this invention to provide a contoured layer pad particularly for use with palletized unstable articles.

It is another object of this invention to provide a contoured layer pad improving the stability of adjacent layers, or groups, of unstable articles.

It is another object of this invention to provide a contoured layer pad having groups of pockets extending from opposite sides of the contoured layer pad.

It is another object of this invention to provide an improved layer pad that is contoured to provide a group of pockets at each side for receiving different portions of unstable articles in different layers, or groups, for stabilizing received unstable articles.

It is another object of this invention to provide an improved palletizing/depalletizing device and method utilizing contoured layer pads.

With these and other objects in view, which will become apparent to one skilled in the art as the description proceeds, this invention resides in the novel construction, combination, arrangement of parts, and method as hereinafter described, and more particularly defined by the appended claims, it being understood that changes in the precise embodiments of the invention are to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 2 is a perspective view of the now preferred contoured layer pad of this invention illustrating unstable articles received at opposite sides of the contoured layer pad;

FIG. 3 is a partial top view illustrating the contoured layer pad shown in FIG. 2;

FIG. 4 is a partial perspective view better illustrating the pockets formed in the contoured layer pad shown in FIGS. 1 through 3;

FIG. 5 is a section view taken through lines 5—5 of FIG. 3 with unstable articles being additionally illustrated at both sides of the contoured layer pad;

FIG. 6 is a section view taken through lines 6—6 of FIG. 3 with unstable articles being additionally illustrated at both sides of the contoured layer pad;

FIG. 7 is a section view taken through lines 7—7 of FIG. 3 with unstable articles being additionally illustrated at both sides of the contoured layer pad;

FIG. 8 is a perspective view of an alternate embodiment of the contoured layer pad of this invention; and FIG. 9 is a partial perspective view of a second alternate embodiment of the contoured layer pad of this invention.

DESCRIPTION OF THE INVENTION

Figure 1:
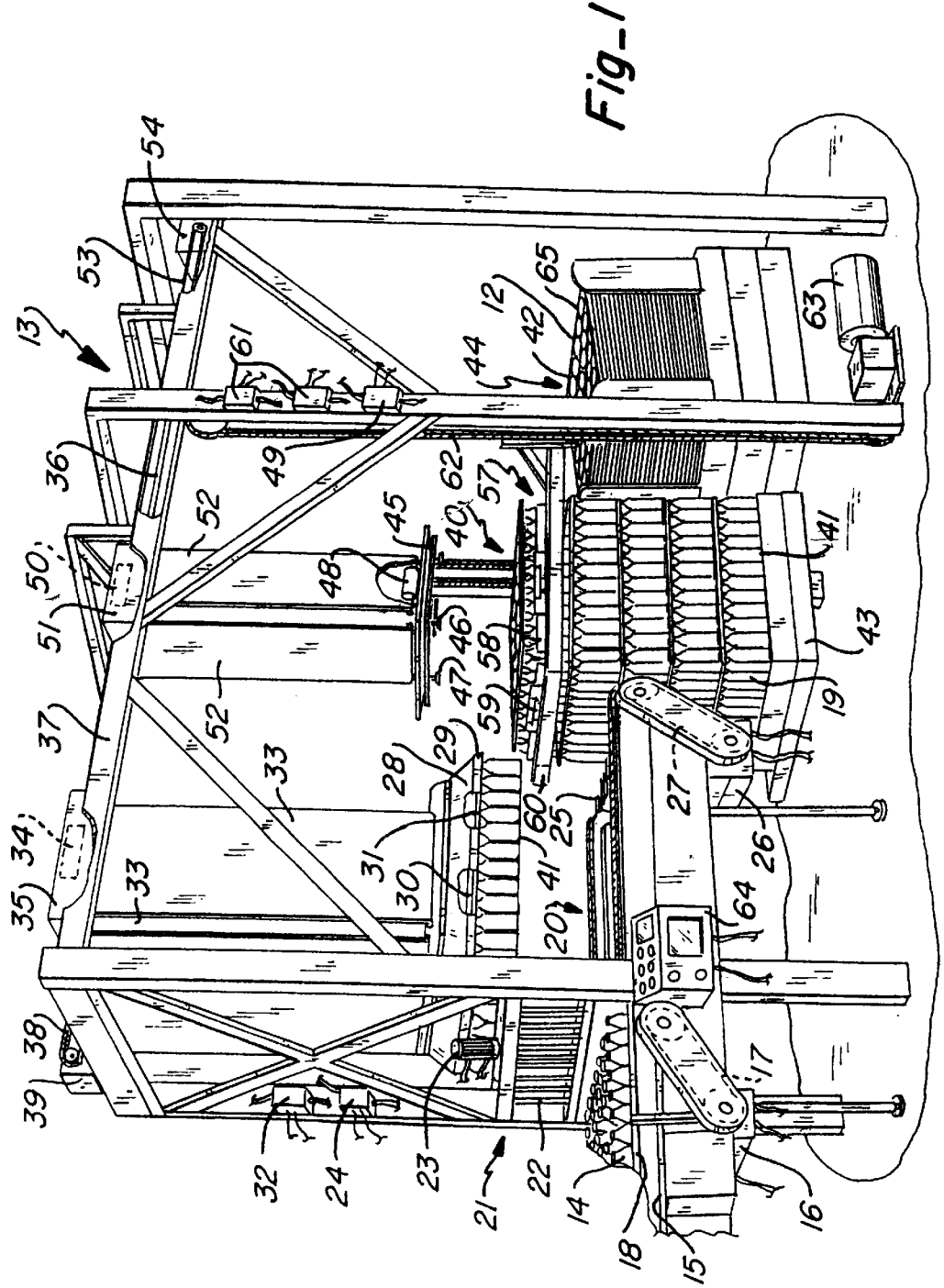
FIG. 1 is a perspective view of a palletizing/depalletizing device utilizing the contoured layer pad of this invention.

Contoured layer pad 12 is shown in FIG. 1 incorporated into a palletizing/depalletizing device 13 with device 13 normally receiving articles, such as unstable articles, 14 in an upright position with contoured layer pad 12 in a horizontal position. It is meant to be realized, however, that the contoured layer pad of this invention could be used in positions other than horizontal if received articles so required.

As shown, palletizing/depalletizing device 13, when operating in a palletizing mode, receives unstable articles 14 on an incoming belt conveyor 15, driven by electric motor 16 through chain 17, with belt conveyor 15 normally having side rails 18 at the opposite sides thereof.

The unstable articles are preferably conveyed in a predetermined manner, such as in a nested pattern, as is shown in FIGS. 1 through 8, with each layer (or group) 19 of the unstable articles being conveyed toward loading area 20 as allowed by article flow control unit 21 the plungers 22 of which are withdrawn from the article flow path under the control of air cylinder 23 connected with solenoid 24 to allow passage of each layer of the unstable articles to loading area 20.

As also indicated in FIG. 1, movable article engaging arms 25 driven by electric motor 26 through chain 27 may also be utilized to urge and/or lead the layer of unstable articles into the loading area.

At loading area 20, the unstable articles are picked up, preferably as an entire layer, by article conveyor 28 having pick-up unit 29 with pick-up arms 30 to engage and grip the unstable articles. Relative movement between the pick-up arms is effected by air cylinder 31 under the control of solenoid 32 to engage and disengage the unstable articles.

With the unstable articles to be then transferred gripped by pick-up arms 30, article conveyor 28 is moved vertically upward, to remove the then gripped articles from loading area 20, by belts 33 under the control of electric motor 34 mounted on movable article carriage 35.

Article carriage 35 is mounted on horizontal tracks 36 mounted on frame 37 to enable movement of article carriage 35 in horizontal directions along tracks 36 by chain 38 driven by electric motor 39 also mounted on frame 37, thus enabling movement of article conveyor 28 in vertical and horizontal directions (or at least partially in an arc, for example, by operating electric motor 39 while operating electric motor 34) so that the articles then being transferred are moved, or transferred, from loading area 20 to palletizing area 40.

At palletizing area 40, the unstable articles then being transferred are deposited by article conveyor 28 onto a contoured layer pad 12 of this invention with a first portion 41 (the base portion of the unstable article as shown in the drawings) being received in pockets 42 (first, or upper, pockets as shown in the drawings) in a contoured layer pad then positioned above a previously deposited layer of unstable articles on pallet 43, as is indicated in FIG. 1 (or directly on pallet 43 if no previous layers have been deposited on the pallet), after which the then deposited articles are released by the article pick-up unit and the article conveyor is moved from the palletizing area and returned to the loading area.

Prior to deposit of each layer of unstable articles at palletizing area 40, a contoured layer pad 12 is withdrawn from layer pad storage area 44 (where a stack of contoured layer pads 12 are stored as indicated in FIG. 1) by layer pad conveyor 45 having layer pad pick-up unit 46 (preferably by vacuum pick up using a plurality of vacuum cups 47, connected with vacuum generator 48 also preferably mounted on layer pad conveyor 45 and controlled by solenoid 49, as also indicated in FIG. 1) to engage the contoured layer pad at the top of the layer pad stack.

The contoured layer pad then engaged is removed from the layer pad stack at layer pad storage area 44 by operation of electric motor 50 mounted on layer pad carriage 51 mounted on horizontal tracks 36 mounted on frame 37 (or alternately on horizontal tracks independent of tracks 36 mounted on frame 37). Belts 52, connected with layer pad conveyor 45, are extended and retracted by operation of electric motor 50 to cause vertical movement of layer pad conveyor 45 upward and downward, and chain 53 driven by electric motor 54, mounted of frame 37, controls the horizontal movement of layer pad carriage 51 along tracks 36.

The contoured layer pad to then be picked up and transferred to palletizing area 40 is thus moved vertically upward from layer pad storage area 44 by operation of electric motor 50, is moved horizontally by operation of electric motor 54, and then is moved vertically downward to palletizing area 40 by operation of electric motor 50 (alternately at least partial movement of the articles in an arc can be effected by operation of electric motor 54 during operation of electric motor 50).

After deposit of each contoured layer pad, electric motors 50 and 54 are operated to withdraw layer pad conveyor 45 from the palletizing area and return the layer pad conveyor to the layer pad storage area.

As indicated in FIG. 1, the contoured layer pad 12 withdrawn from layer pad storage area 44 is deposited at palletizing area 40 with pockets 55 (second, or lower pockets as indicated in the drawings) in the contoured layer pad receiving second portions 56 (the neck portions of the unstable articles as shown in the drawings) of the layer of unstable articles last previously transferred to the palletizing area (as brought out above, a contoured layer pad is preferably also transferred to the palletizing area prior to transfer of unstable articles thereto and is deposited directly on pallet 43).

As indicated in FIG. 1, orienting unit 57 has engaging fences 58, operated by air cylinders 59 mounted on support frame 60 and controlled by solenoids 61, that are utilized to position (normally center) the unstable articles and the contoured layer pads during palletizing operations. As shown, support frame 60 is vertically adjusted in position by chain 62 driven by electric motor 63 (indicated in FIG. 1 to have a gear box connected therewith).

When operating in the depalletizing mode, palletizing area 40 becomes a depalletizing area and the unstable articles are removed in layers by causing article conveyor 28 to remove each layer of unstable articles from the palletizing area and depositing the removed layer at area 20 (now an unloading area), with the unstable articles then being conveyed from area 20 by conveyor 15 (then operating as an outgoing conveyor). Each contoured layer pad is also removed by layer pad conveyor 45 after removal of each layer of articles from the depalletizing area and returned to layer pad storage area 44.

Operation in both the palletizing and depalletizing modes may be controlled by control unit 64 (preferably including a computer).

Contoured layer pad 12 is preferably formed of plastic material that is semi-rigid when formed, particularly for use with palletized unstable articles, and, when used with palletized unstable articles, is preferably of a size to receive an entire layer of the unstable articles palletized.

As best shown in FIGS. 2 through 7, contoured layer pad 12 has one side 65 (an upper side as shown in the drawings) with the first group of pockets 42 thereat, and an opposite side 66 (a lower side as shown in the drawings) with the second group of pockets 55 thereat. As indicated in FIGS. 1 through 8, the pockets are arranged to accept articles in a nested pattern, or relationship.

Pockets 42 extend in a first direction (upward as shown in FIGS. 1 through 9) from side 65 of the contoured layer pad, and pockets 55 extend in a second direction (downward as shown in FIGS. 1 through 9) from side 66 (i.e., from the side opposite to that of side 65) of the contoured layer pad.

Each pocket 42 has an end portion 68 and a side portion 69 that extends from the end portion with each side portion preferably having grooves 70 therein to at least partially facilitate receiving the portion of the unstable article intended to be received therein (such as a base portion of the unstable articles), and each pocket 55 has an end portion 71 and a side portion 72 that extends as an annular projection from the end portion preferably a short distance to provide a pocket depth much smaller than that of the depth of pockets 42 to at least in part facilitate receiving the portion of the unstable article intended to be received therein (such as a neck portion of the unstable articles) and to allow the end portion 68 of each pocket 42 to be essentially flat with no upward indentation, or projection, that might prevent the portions of some articles to be received in pockets 42 from being fully received in the pockets as intended.

As shown, end portions 68 of pockets 42 are normally larger than end portions 71 of pockets 55 (particularly where pockets 42 receive the base portions of the unstable articles and pockets 55 receive the neck portions of the unstable articles) and each pocket 42 is preferably associated with a different one of pockets 55 to form associated pairs of pockets with end portion 71 of each pocket 55 having a common portion with respect to a part of end portion 68 of each associated pocket 42 (and thus are coincidental where common), and with end portions 68 and 71 facing in opposite directions from the opposite sides of the contoured layer pad.

As shown, pockets 42 are configured to receive (and preferably snugly receive) one portion of the unstable articles (the base portion of the unstable article as shown) and pockets 55 are configured to receive (and preferably snugly receive) another portion of the unstable articles (the neck portion of the unstable article as shown).

The configuration and relative positioning of associated pockets 42 and 55 is preferably such that unstable articles in adjacent layers are substantially aligned when the first and second portions are positioned in the associated pockets.

By configuring pockets 42 and 55 with circular cross-sections the center lines of which fall along a line that is co-axial with respect to both of the associated pockets, unstable articles having base portions with a circular cross-section like that of pockets 42 (but slightly smaller in size) and neck portions with a circular cross-section like that of pockets 55 (but again slightly smaller in size), as is indicated in the drawings, when positioned with the base portions of one layer in pockets 42 and the neck portions of the adjacent layer in associated pockets 55, are substantially co-axial and substantially aligned with one another.

Alternate configurations of the contoured layer pad are shown in FIGS. 8 and 9.

As shown in FIG. 8, contoured layer pad 12 is configured to receive unstable articles 14 in a nested relationship, but has a flat central area 74 surrounded by multiple rows 75 of associated pairs of pockets 42 and 55, rather than having associated rows of pockets throughout substantially the entire contoured layer pad as is shown in FIGS. 1 through 7. As indicated, flat central area 74 extends parallel to end portions 68 of pockets 42 to allow the entire layer of unstable articles to be deposited on the contoured layer pad.

As indicated by the embodiment shown in FIG. 8, the multiple rows of unstable articles at the periphery of adjacent layers of unstable articles are to be received in the multiple rows of associated pockets at the periphery of the contoured layer pad and the remainder of the adjacent layers of unstable articles are to be received at the flat central area of the contoured layer pad.

Such an arrangement of the contoured layer pad as shown in FIG. 8 could reduce the cost of the contoured layer pad and yet provide more convenient use with sufficient improved stability for at least some applications, particularly for use with plastic articles, for example, wherein the unstable articles have a tendency to be attracted to one another when positioned in close proximity to one another.

The alternate embodiment shown in FIG. 9 is similar to that of FIG. 8, but, as illustrated, is for use with unstable articles in a straight line pattern (as opposed to a nested pattern) and illustrates a single row 76 of associated pairs of pockets 42 and 55 about the periphery of the contoured layer pad with an enlarged flat area 77 at the central portion of the contoured layer pad.

Modifications to the alternate embodiments shown in FIGS. 8 and 9 could also be made, including, for example, use of a single row of articles in a nested pattern with a flat central area, multiple rows of associated pairs of pockets in a straight line pattern with a central flat area, or multiple rows of associated pockets in a straight line pattern extending substantially over the entire contoured layer pad.

Other devices could utilize the contoured layer pad of this invention, including other devices for palletizing, such as, for example, devices as shown or suggested in the background set forth herein, and the contoured layer pad of this invention is not meant to be limited to palletizing or to a palletizing device as specifically shown and described herein.

As appreciated from the foregoing, the contoured layer pad of this invention provides an improved layer pad with the improved contoured layer pad being particularly useful to stabilize palletized unstable articles.

What is claimed is:

1. A contoured layer pad that is a contoured spacer sheet with the contoured layer pad having spaced first and second opposite sides and formed to be positioned between first and second layers of palletized unstable articles each having first and second end portions with a middle portion therebetween, said contoured layer pad comprising:
    a first article receiving area at the first side of the contoured layer pad that concurrently receives the first end portions of the unstable articles of the entire first layer of unstable articles to be palletized with said first article receiving area including first pockets formed at the first side of the contoured layer pad, said first pockets receiving first end portions of unstable articles of the first layer of unstable articles with the middle portions of the entire first layer of unstable articles in close proximity to one another; and
    a second article receiving area at the second side of the contoured layer pad that concurrently receives the second end portions of the unstable articles of the entire second layer of unstable articles to be palletized with said second article receiving area including second pockets formed at the second side of the contoured layer pad, said second pockets receiving second end portions of unstable articles of the second layer of unstable articles with the middle portions of the entire second layer of unstable articles in close proximity to one another;
    whereby the unstable articles of the first and second layers of unstable articles have improved stability when palletized with the contoured layer pad therebetween.

2. The contoured layer pad of claim 1 wherein the first and second opposite sides of the contoured layer pad have a central portion and a peripheral portion with said first and second pockets thereat, and wherein the first portions of the unstable articles of the entire first and second layers of unstable articles are concurrently received at both said central portion and said pockets at said peripheral portion at the opposite sides of the contoured layer pad.

3. The contoured layer pad of claim 2 wherein said central portions at the first and second opposite sides of the contoured layer pad have substantially flat surfaces, and wherein said first and second pockets at said peripheral portions of the first and second opposite sides of the contoured layer pad have substantially flat end portions to thereby enable engagement of the unstable articles of the entire first and second layers of unstable articles with substantially flat surfaces at the first and second opposite sides of the contoured layer pad.

4. The contoured layer pad of claim 3 wherein said substantially flat end portions of said first and second pockets at said peripheral portions of the contoured layer pad and said substantially flat surfaces at said central portions of the contoured layer pad are substantially parallel.

5. The contoured layer pad of claim 1 wherein the unstable articles at each of the first and second layers of unstable articles have a nested relationship with respect to one another, and wherein said first and second pockets are formed to enable receiving and maintaining the unstable articles of each layer in said nested relationship.

6. The contoured layer pad of claim 1 wherein the contoured layer pad is formed to be substantially solid.

7. The contoured layer pad of claim 1 wherein the unstable articles in the first and second layers of palletized unstable articles are empty containers.

8. The contoured layer pad of claim 1 wherein the first and second portions of the unstable articles are base and neck portions.

9. A contoured layer pad that is a contoured spacer sheet with the contoured layer pad having spaced first and second opposite sides and formed to be positioned between first and second layers of unstable articles with each layer of unstable articles including centrally and peripherally positioned unstable articles and with the unstable articles having first and second end portions with a middle portion therebetween, said contoured layer pad comprising:
    a central portion having substantially flat first and second surfaces at the first and second opposite sides of the contoured layer pad for receiving first and second end portions of the centrally positioned unstable articles of the first and second layers of unstable articles;

a peripheral portion having first and second surfaces at the first and second opposite sides of the contoured layer pad and substantially surrounding said first and second surfaces of said central portion;

first pockets formed at said first surface of said peripheral portion at the first side of the contoured layer pad with said first pockets receiving first end portions of the peripherally positioned unstable articles of the first layer of unstable articles with the middle portions of the first layer of unstable articles received at the first side of both the central and peripheral portions of the contoured layer pad being maintained in close proximity to one another; and second pockets formed at said second surface of said peripheral portion at the second side of the contoured layer pad with said second pockets receiving second end portions of the peripherally positioned unstable articles of the second layer of unstable articles with the middle portions of the second layer of unstable articles received at the second side of both the central and peripheral portions of the contoured layer pad being maintained in close proximity to one another;

whereby the unstable articles of the first and second layers of unstable articles have improved stability by positioning the contoured layer pad between the first and second layers of unstable articles.

10. The contoured layer pad of claim 9 wherein said first and second pockets are in rows and include at least one row of first and second pockets extending in close relationship with respect to one another about said first and second surfaces of said peripheral portion of the contoured layer pad and have said first and second surfaces of said central portion of the contoured layer pad extending therebetween.

11. The contoured layer pad of claim 9 wherein said first and second pockets are in rows and include at least two rows of first and second pockets extending in close relationship with respect to one another about said first and second surfaces of said peripheral portion of the contoured layer pad and have said first and second surfaces of said central portion of the contoured layer pad extending therebetween.

12. The contoured layer pad of claim 9 wherein at least said first pockets have substantially flat end portions that extend substantially parallel with respect to said first surface of said central portion of the contoured layer pad.

13. A contoured layer pad having spaced first and second opposite sides and formed to be positioned between first and second layers of unstable articles to be palletized with the unstable articles of each layer being in rows and with the unstable articles of each layer having first and second end portions, said contoured layer pad comprising:

a group of first pockets at the first side of the contoured layer pad to receive the first end portion of different ones of the first layer of unstable articles with the unstable articles of the rows of unstable articles of the first layer being received and maintained offset from adjacent unstable articles of each adjacent row such that a nested relationship is formed between the unstable articles of the first layer; and a group of second pockets at the second side of the contoured layer pad to receive the second end portion of different ones of the second layer of unstable articles with the unstable articles of the rows of unstable articles of the second layer being received and maintained offset from adjacent unstable articles of each adjacent row such that a nested relationship is formed between the unstable articles of the second layer;

whereby the first and second layers of unstable articles have improved stability when the unstable articles of each layer are maintained in nested relationship palletized with the contoured layer pad therebetween with first and second end portions of the unstable articles in said first and second pockets.

14. The contoured layer pad of claim 13 wherein the contoured layer pad has a central portion with first and second surfaces at the first and second opposite sides of the contoured layer pad and a peripheral portion with said groups of first and second pockets therein at the first and second opposite sides of the contoured layer pad and with said peripheral portion substantially surrounding said central portion whereby the first and second portions of the first and second layers of unstable articles are received at said first and second surfaces at said central portion of the contoured layer pad and at said groups of first and second pockets at the periphery of the contoured layer pad.

15. The contoured layer pad of claim 14 herein said groups of first and second pockets at said peripheral portion of said contoured layer pad include at least one row of said first and second pockets at opposite sides of the contoured layer pad to receive first and second portions of the first and second layers of unstable articles with said central portion extending inwardly from said peripheral portion to receive the first and second portions of the unstable articles of the first and second layers of unstable articles not received in said first and second pockets.

16. The contoured layer pad of claim 15 wherein said first and second surfaces of said central portion are substantially flat surfaces, and wherein said first and second end portions of said first and second pockets are substantially flat and extend substantially parallel with respect to said first and second surfaces of said central portion.

17. A method for improving the stability of palletized unstable articles having first and second end portions with a middle portion therebetween, said method comprising:

concurrently transferring the unstable articles of a first layer of unstable articles onto a pallet with the first end portions of the unstable articles being closer to said pallet than are the second end portions;

thereafter inserting a contoured layer pad having closely spaced first and second opposite sides with said first side having first pockets thereat and said second side having second pockets thereat over said first layer of unstable articles then on said pallet with said second pockets at said second side of said contoured layer pad receiving second end portions of said first layer of unstable articles therein with the middle portions of the entire said first layer of unstable articles being in close proximity to one another; and thereafter concurrently transferring the unstable articles of a second layer of unstable articles onto said contoured layer pad then on said pallet with said first pockets at said first side of said contoured layer pad receiving first end portions of said second layer of unstable articles therein with the middle portions of the entire said second layer of unstable articles being in close proximity to one another and with unstable articles in said first layer of unstable articles being spaced from unstable articles in said second layer of unstable articles.

18. The method of claim 17 wherein said method includes concurrently transferring said first and second layers of unstable articles with the unstable articles of each layer of unstable articles maintained in a nested relationship, and providing said first and second pockets in said contoured layer pad that enable maintaining said nested relationship between the unstable articles of said first and second layer of unstable articles.

19. The method of claim 18 wherein said method includes providing associated first and second pockets at said first and second sides of said contoured layer pad with each of said associated first and second pockets receiving said first and second portions of the same unstable article in a layer of unstable articles, and providing sufficient associated first and second pockets to receive different ones of said first and second portions of an entire layer of each said first and second layers of unstable articles with the unstable articles of each layer being in nested relationship when said portions are received in said associated pockets.

20. The method of claim 17 wherein said method includes providing a contoured layer pad with a peripheral portion and a central portion, said peripheral portion having said first and second pockets at said opposite sides of said contoured layer pad with said pockets having substantially flat first and second end portions, said central portion having substantially flat first and second surfaces extending substantially parallel to said end portions of said first and second pockets, and with the unstable articles of said entire first and second layers of unstable articles being received at said peripheral and central portions of said contoured layer pad for engagement thereat with said substantially flat end portions of said first and second pockets and said substantially flat surfaces of said central portion.

21. The method of claim 17 wherein said method includes providing empty bottles as said unstable articles of said first and second layers of unstable articles to be palletized.

* * * * *